(12) United States Patent
Engelfried et al.

(10) Patent No.: US 10,639,731 B2
(45) Date of Patent: May 5, 2020

(54) HAND-HELD POWER TOOL HAVING A TOOL RECEIVER

(71) Applicant: Robert Bosch GmbH, Stuttgart (DE)

(72) Inventors: Uwe Engelfried, Ostfildern (DE); Thomas Duerr, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/510,419

(22) PCT Filed: Sep. 23, 2015

(86) PCT No.: PCT/EP2015/071867
§ 371 (c)(1),
(2) Date: Mar. 10, 2017

(87) PCT Pub. No.: WO2016/062492
PCT Pub. Date: Apr. 28, 2016

(65) Prior Publication Data
US 2017/0291237 A1   Oct. 12, 2017

(30) Foreign Application Priority Data

Oct. 20, 2014   (DE) .......................... 10 2014 221 213

(51) Int. Cl.
*B23D 59/00* (2006.01)
*B23Q 11/00* (2006.01)
(Continued)

(52) U.S. Cl.
CPC ......... *B23D 59/006* (2013.01); *B23D 49/162* (2013.01); *B23D 57/023* (2013.01);
(Continued)

(58) Field of Classification Search
CPC .. B23D 59/006; B23D 57/023; B23D 49/162; B25F 3/00; B23Q 11/0046; B23Q 11/0071
(Continued)

(56) References Cited

U.S. PATENT DOCUMENTS 4,102,083 A * 7/1978 Stern ...................... B24B 55/102
251/149.5
4,382,334 A * 5/1983 Reynolds ............. B23D 63/168
144/73

(Continued)

FOREIGN PATENT DOCUMENTS

CN   101947768 A   1/2011
CN   103128337 A   6/2013
(Continued)

OTHER PUBLICATIONS

International Search Report corresponding to PCT Application No. PCT/EP2015/071867, dated Dec. 10, 2015 (German and English language document) (7 pages).

*Primary Examiner* — Ghassem Alie
*Assistant Examiner* — Bharat C Patel
(74) *Attorney, Agent, or Firm* — Maginot, Moore & Beck LLP

(57) ABSTRACT

A hand-held power tool includes an SDS tool receiver and a tool housing. The SDS tool receiver includes at least one vacuuming-off channel and is configured to receive an exchangeable insert tool such that the at least one vacuuming-off channel enables removal of dust produced during operation of the exchangeable insert tool with a workpiece. The tool housing includes at least one drive unit configured to drive the exchangeable insert tool.

14 Claims, 5 Drawing Sheets

(51) Int. Cl.
*B25F 3/00* (2006.01)
*B23D 49/16* (2006.01)
*B23D 57/02* (2006.01)

(52) U.S. Cl.
CPC ...... *B23Q 11/0046* (2013.01); *B23Q 11/0071* (2013.01); *B25F 3/00* (2013.01)

(58) Field of Classification Search
USPC .......................................... 30/124, 386, 392
See application file for complete search history.

(56) References Cited

U.S. PATENT DOCUMENTS

| | | | | |
|---|---|---|---|---|
| 5,993,305 | A * | 11/1999 | Chu | B24B 23/03 451/357 |
| 6,408,730 | B1 * | 6/2002 | Tinner | B27B 33/142 30/376 |
| 6,694,623 | B1 * | 2/2004 | Haughey | B27B 17/14 30/386 |
| 7,036,703 | B2 * | 5/2006 | Grazioli | B25B 27/0085 173/176 |
| 7,055,250 | B2 * | 6/2006 | Allemann | B23D 57/023 30/374 |
| 7,077,179 | B1 * | 7/2006 | Camiano | B23D 45/065 144/1.1 |
| 7,107,689 | B2 * | 9/2006 | Keeton | B27B 17/14 30/383 |
| 7,475,739 | B2 * | 1/2009 | Wuensch | B23Q 11/0046 173/168 |
| 8,186,453 | B2 * | 5/2012 | Furusawa | B23Q 11/0046 173/197 |
| 8,409,310 | B2 * | 4/2013 | Despineux | B23Q 11/0046 173/71 |
| 9,701,037 | B2 * | 7/2017 | Zieger | B27B 17/02 |
| 9,707,677 | B2 * | 7/2017 | Zieger | B25F 5/02 |
| 9,724,841 | B2 * | 8/2017 | Engelfried | B27B 17/14 |
| 9,776,296 | B2 * | 10/2017 | Brewster | B23Q 11/00 |
| 2002/0153373 | A1 * | 10/2002 | Traut | E05D 7/009 220/4.02 |
| 2011/0314682 | A1 * | 12/2011 | Maag | B27B 17/14 30/386 |
| 2012/0118595 | A1 * | 5/2012 | Pellenc | B25F 3/00 173/46 |
| 2014/0250692 | A1 * | 9/2014 | Friedman | A45D 29/02 30/28 |

FOREIGN PATENT DOCUMENTS

| | | | |
|---|---|---|---|
| CN | 203031039 U | 7/2013 | |
| CN | 103567990 A | 2/2014 | |
| DE | 29 18 629 A1 | 11/1980 | |
| DE | 43 40 727 A1 | 6/1995 | |
| DE | 298 06 181 U1 | 8/1998 | |
| DE | 20312740 U1 * | 11/2003 | ........... B23D 59/006 |
| DE | 102004032973 A1 * | 2/2006 | ........... B27G 19/003 |
| DE | 10 2005 062 402 A1 | 6/2007 | |
| DE | 10 2012 211 094 A1 | 1/2014 | |
| EP | 0 610 593 A1 | 8/1994 | |
| EP | 1 491 290 A1 | 12/2004 | |
| EP | 2 428 313 A1 | 3/2012 | |
| GB | 2 260 936 A | 5/1993 | |
| WO | 2014/086926 A1 | 6/2014 | |

* cited by examiner

HAND-HELD POWER TOOL HAVING A TOOL RECEIVER

This application is a 35 U.S.C. § 371 National Stage Application of PCT/EP2015/071867, filed on Sep. 23, 2015, which claims the benefit of priority to Serial No. DE 10 2014 221 213.8, filed on Oct. 20, 2014 in Germany, the disclosures of which are incorporated herein by reference in their entirety.

FIELD OF INVENTION

Background

The present invention relates to a hand-held power tool having a tool housing, in which there is provided at least one drive unit for driving an exchangeable insert tool designed for working on workpieces, and wherein an SDS tool receiver also known in the art as the "Special Direct System" developed in 1975 by Hilti and Bosch) is provided for receiving the exchangeable insert tool.

Such a hand-held power tool, e.g. realized in the manner of a jigsaw, having an SDS tool receiver for receiving an exchangeable insert tool, to which an external vacuum cleaning system is assigned, is known from the prior art. This vacuum cleaning system serves to remove dust produced during operation of the jigsaw, in working on a workpiece. For this purpose, the external vacuum cleaning system has a dust collection means disposed, in the region of the insert tool, on the tool housing.

A disadvantage of this prior art is that, as a result of being disposed on the tool housing, the external vacuum cleaning system, or the dust collection means thereof, increases the dimensions of the jigsaw, or of the hand-held power tool, and consequently impairs the overall handling of the latter. Moreover, at least the dust collection means is disposed in the region of the insert tool, with the result that a workpiece that is to be worked is at least partially covered.

SUMMARY

It is therefore an object of the disclosure to provide a new hand-held power tool, having an SDS tool receiver, which is provided with a vacuuming cleaning system that has reduced dimensions, at least in the region of the SDS tool receiver.

This problem is solved by a hand-held power tool having a tool housing, in which there is provided at least one drive unit for driving an exchangeable insert tool designed for working on workpieces, wherein an SDS tool receiver, for receiving the exchangeable insert tool, is provided. The SDS tool receiver has at least one vacuuming-off channel for removing dust produced during working on a workpiece.

The disclosure thus makes it possible to provide a hand-held power tool having an SDS tool receiver and a vacuum cleaning system, in which it is made possible to reduce the dimensions of the vacuum cleaning system as a result of a vacuuming-off channel of the vacuum cleaning system being integrated into the SDS tool receiver. Moreover, this integration makes it possible to prevent a respective workpiece being covered by the vacuum cleaning system during operation of the hand-held power tool.

Preferably, the SDS tool receiver has a receiver housing, wherein the at least one vacuuming-off channel is formed into the receiver housing.

The provision of a vacuuming-off channel that is integrated into the SDS tool receiver can thus be achieved in a simple manner.

The SDS tool receiver preferably has a main body, which can be closed with a closure element, and which is connected to the tool housing, formed onto the tool housing or realized so as to be integral with the tool housing.

The SDS tool receiver as such can thus be protected against soiling, e.g. by sawing chips or sanding dust, which may be produced during working on a workpiece, in a reliable and uncomplicated manner.

Preferably, a clamping device, for clamping-in the insert tool, is disposed in the main body.

It is thus also made possible for the clamping device to be disposed in the main body so as to be at least largely free of soiling.

The at least one vacuuming-off channel is preferably realized, at least in regions, in the main body and/or in the closure element.

The at least one vacuuming-off channel can thus be realized, in a simple and inexpensive manner, as an integral constituent part in the SDS tool receiver.

According to one embodiment, the main body has at least one first flute-type channel, and the closure element is provided with at least one second flute-type channel, wherein the first flute-type channel and the second flute-type channel are realized so as to realize the at least one vacuuming-off channel when the main body is closed with the closure element.

A two-part vacuuming-off channel can thus be provided, which can easily be opened in its longitudinal extent by opening of the closure element, and can consequently be cleaned in a rapid and uncomplicated manner.

The closure element preferably has a locking element for locking to the main body.

The closure element can thus be locked to the main body in a secure and reliable manner, realizing the at least one vacuuming-off channel.

Preferably, the locking element is realized to latch on the main body, and has at least one latching element.

A simple and inexpensive locking element can thus be provided.

Preferably, the locking element is realized for screw connection to the main body, wherein at least one screw thread is provided on the main body.

A secure and reliable locking element can thus be provided.

The closure element is preferably disposed in a pivotable manner on the main body.

Securing of the closure element to the main body can thus be achieved in a simple manner.

Preferably, the at least one vacuuming-off channel is tubular in form.

An operationally reliable and powerful vacuuming-off channel can thus be provided.

The at least one vacuuming-off channel is preferably connected to a vacuuming-off connecting piece for connection to an external vacuuming-off system.

The dust that is produced can thus be vacuumed-off, or removed, by the external vacuuming-off system in a safe and uncomplicated manner.

According to one embodiment, the exchangeable insert tool is realized in the manner of a cutting strand realized to revolve around an assigned guide unit.

A suitable insert tool can thus be provided in a simple manner.

Preferably, the hand-held power tool is realized in the manner of a chain saw.

The vacuum cleaning system according to the disclosure can thus be applied in the case of a multiplicity of differing hand-held power tools such as, for example, a chain saw.

The problem stated at the outset is also solved by an SDS tool receiver for receiving an exchangeable insert tool designed for working on workpieces. This SDS tool receiver has at least one vacuuming-off channel for removing dust produced during working on a workpiece.

BRIEF DESCRIPTION OF THE DRAWINGS

The disclosure is explained in greater detail in the following description on the basis exemplary embodiments represented in the drawings. There are shown in.

DETAILED DESCRIPTION

Figure 1:
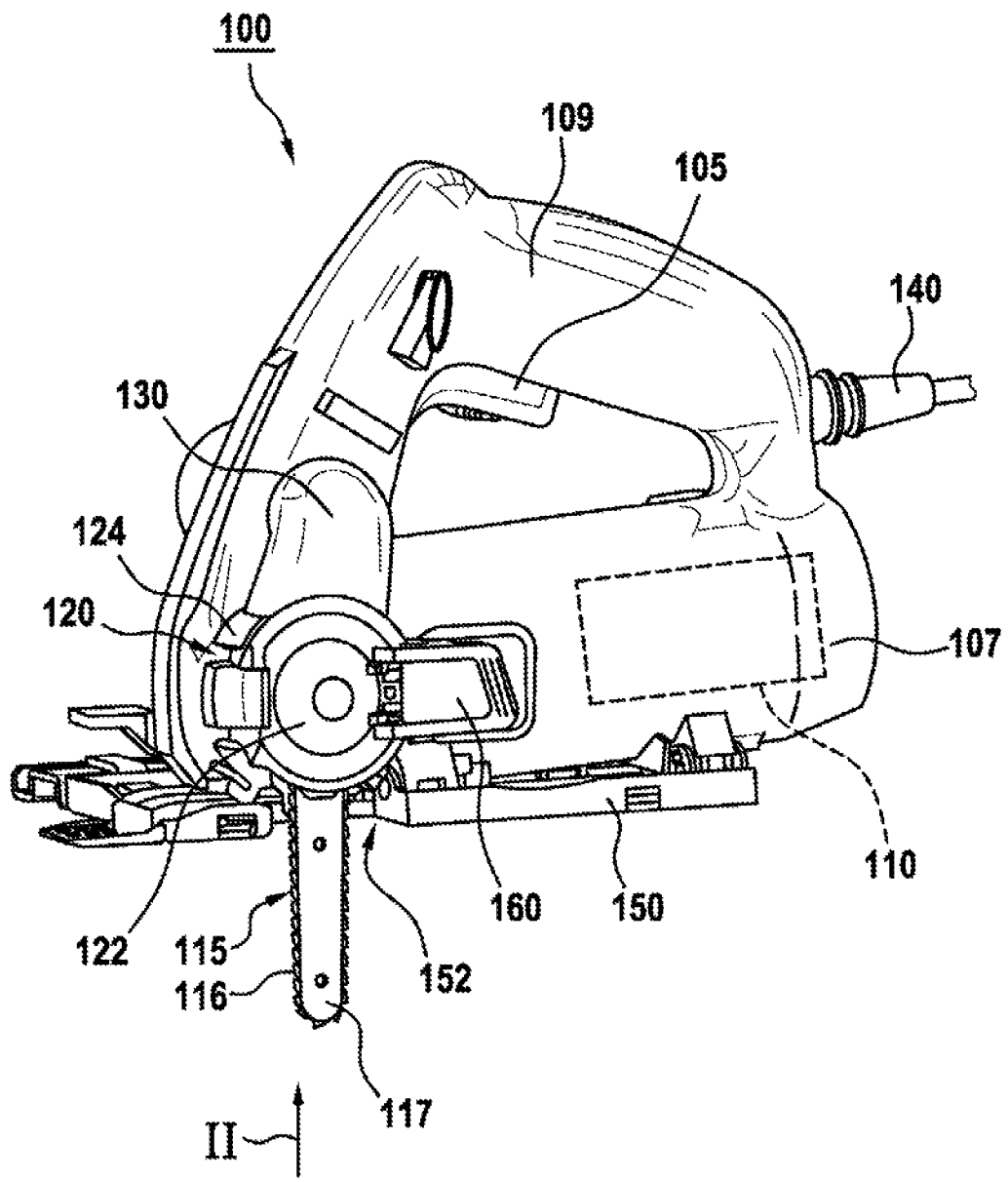
FIG. 1 a perspective view of a hand-held power tool realized in the manner of a chain saw, having an SDS tool receiver according to a first embodiment, FIG. 2 a perspective view of a portion of an underside of the hand-held power tool having the SDS tool receiver from FIG. 1, FIG. 3 a perspective side view of the SDS tool receiver from FIG. 1 and FIG. 2, in the opened state, FIG. 4 a perspective side view of a portion of the hand-held power tool from FIG. 1, having an SDS tool receiver according to a second embodiment, and FIG. 5 a perspective view of a portion of an underside of the hand-held power tool from FIG. 1, having the SDS tool receiver from FIG. 4.

FIG. 1 shows a hand-held power tool 100, having a tool housing 107 that is provided, by way of example, with a bail-type handle 109. Preferably, disposed in the tool housing 107 there is at least one drive unit 110, for driving an exchangeable insert tool 115 designed for working on workpieces. The drive unit 110 can be actuated by a user, i.e. at least switched on and switch off, e.g. via a manually operated switch 105, or manually operated button, is preferably realized as a drive motor and is therefore also referred to in the following as a "drive motor 110". This drive motor 110 may be any type of motor, e.g. an electronically commutated motor or a direct-current motor. Preferably, the drive motor 110 can be electronically controlled by open-loop or closed-loop control, by means of an electronic control unit, in such a manner that, for example, specifications in respect of a desired rotational speed of the drive motor 110 can be realized. The workings and the structure of such a drive motor 110, and of the electronic control unit, are adequately known from the prior art, such that, for the purpose of conciseness of description, a detailed description is not given here.

According to one embodiment, a tool receiver 120 that, according to the disclosure, is realized in the manner of an SDS tool receiver, is provided to receive the exchangeable insert tool 115. In the context of the present disclosure, the term "SDS tool receiver" refers generally to a quick-clamp tool receiver, in which the exchangeable mini-tools can be clamped without the use of a tool. Such a quick-clamp tool receiver preferably has a structure like that of, for example, the quick-clamp tool receiver known from DE 10 2012 211 094 A1, the disclosure of which is explicitly included, as an integral constituent part, in the present description, such that, for the purpose of conciseness and simplicity of description, there is no need for a detailed description of the structure and functionality of the SDS tool receiver 120.

It is pointed out, however, that the present disclosure is not limited to an SDS tool receiver constructed as in DE 10 2012 211 094 A1, but may be applied quite generally in the case of all SDS tool receivers for receiving exchangeable SDS mini-tools, irrespective of whether the SDS tool receiver is an SDS-max, SDS-quick, SDS-plus or SDS-top tool receiver. Furthermore, it is pointed out that the present disclosure may also be applied in the case of quick-clamp tool receivers whose structure is merely similar to that of usual SDS tool receivers, or that have a similar functionality, but that are not identified by the designation "SDS", since the latter, as undoubtedly known by persons skilled in the art, is a designation created by Robert Bosch GmbH for quick-clamp tool receivers, or mini-tools.

The SDS tool receiver 120 preferably has a receiver housing 122, 124, having a closure element 122 and a main body 124, the closure element 122 being realized to close the main body 124, at least when the hand-held power tool 100 is in operation. The main body 124 is preferably connected to the tool housing 107, formed onto the tool housing 107 or realized so as to be integral with the tool housing 107. Furthermore, for the purpose of locking to the main body 124, the closure element 122 preferably has a locking element 160, described in greater detail below with reference to FIG. 2, and is preferably disposed in a pivotable manner on the base 124, as illustrated in FIG. 3.

Preferably, the hand-held power tool 100 is realized in the manner of a chain saw, as also shown and described in DE 10 2012 211 094 A1, in which the exchangeable insert tool 115 is realized in the manner of cutting strand 116 realized to orbit around an assigned guide unit 117. For the purpose of simplicity and clarity of description, therefore, the hand-held power tool 100 is also referred to in the following as the "chain saw 100". Preferably, the cutting strand 116 of the chain saw 100 is realized as a cutting chain.

Furthermore, a foot plate 150 is assigned to the chain saw 100, by means of which the latter can be placed on an assigned workpiece that is to be worked, or guided thereon. In the region of the insert tool 115 that, by way of example, is disposed perpendicularly in relation to the tool housing 107, the foot plate 150 has a recess 152, through which the insert tool 115 extends.

According to one embodiment, a vacuuming-off connecting piece 130, via which dust produced during working on a workpiece can be removed, is disposed on the tool housing 107, in the region of the SDS tool receiver 120. Preferably, the vacuuming-off connecting piece 130 is bent at an angle, and can be connected to an external vacuum cleaning system.

Furthermore, the chain saw 100 is equipped with a flexible electrical connecting lead 140 for mains-dependent power supply. It is pointed out, however, that the present disclosure is not limited to chain saws that have mains-dependent operation, but instead may be applied in the case of a multiplicity of hand-held power tools that are provided with an SDS tool receiver within the meaning of the present disclosure, irrespective of whether these hand-held power tools are of a main-dependent or battery-operated design.

Figure 2:
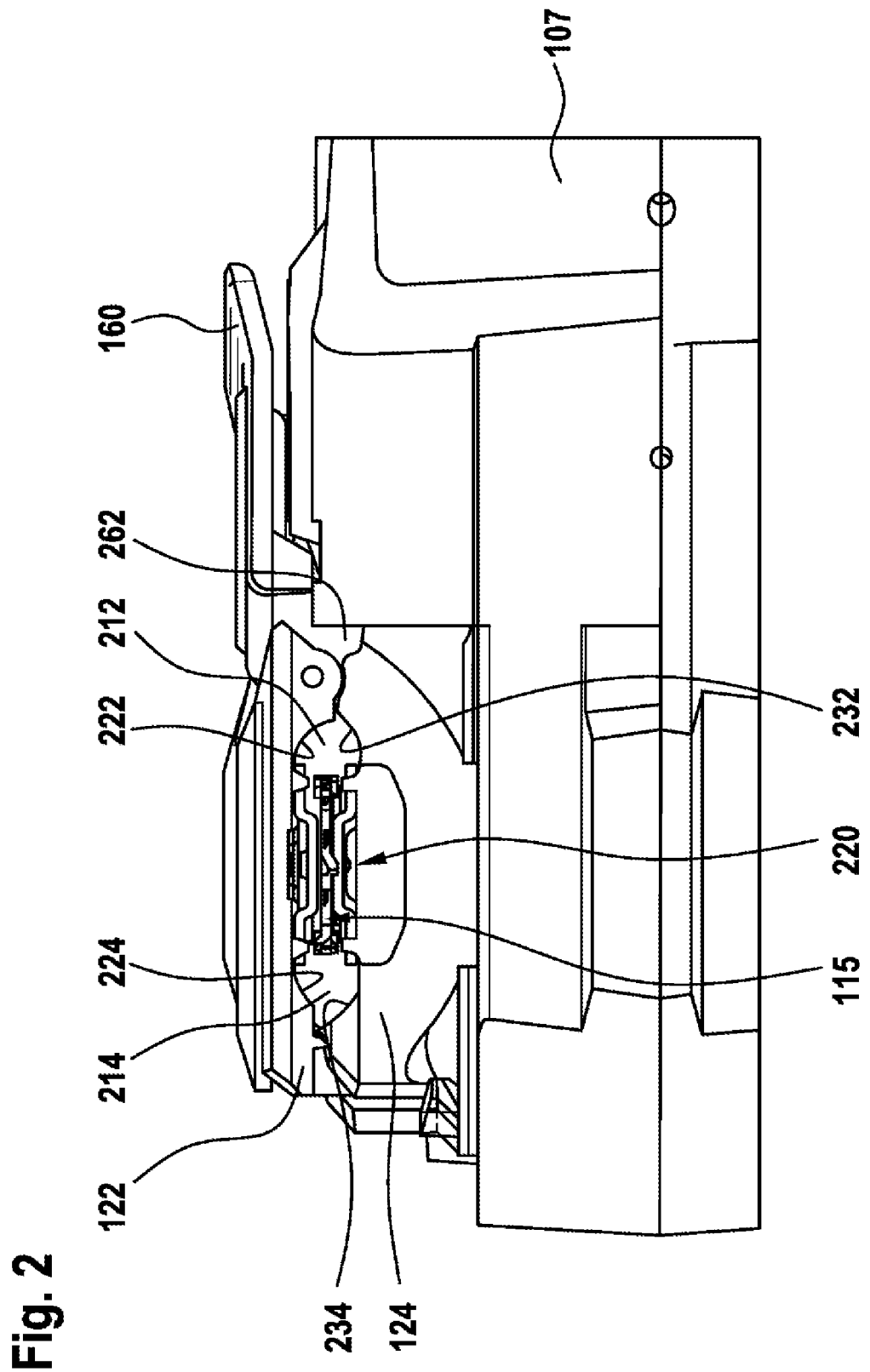
Figure 3:
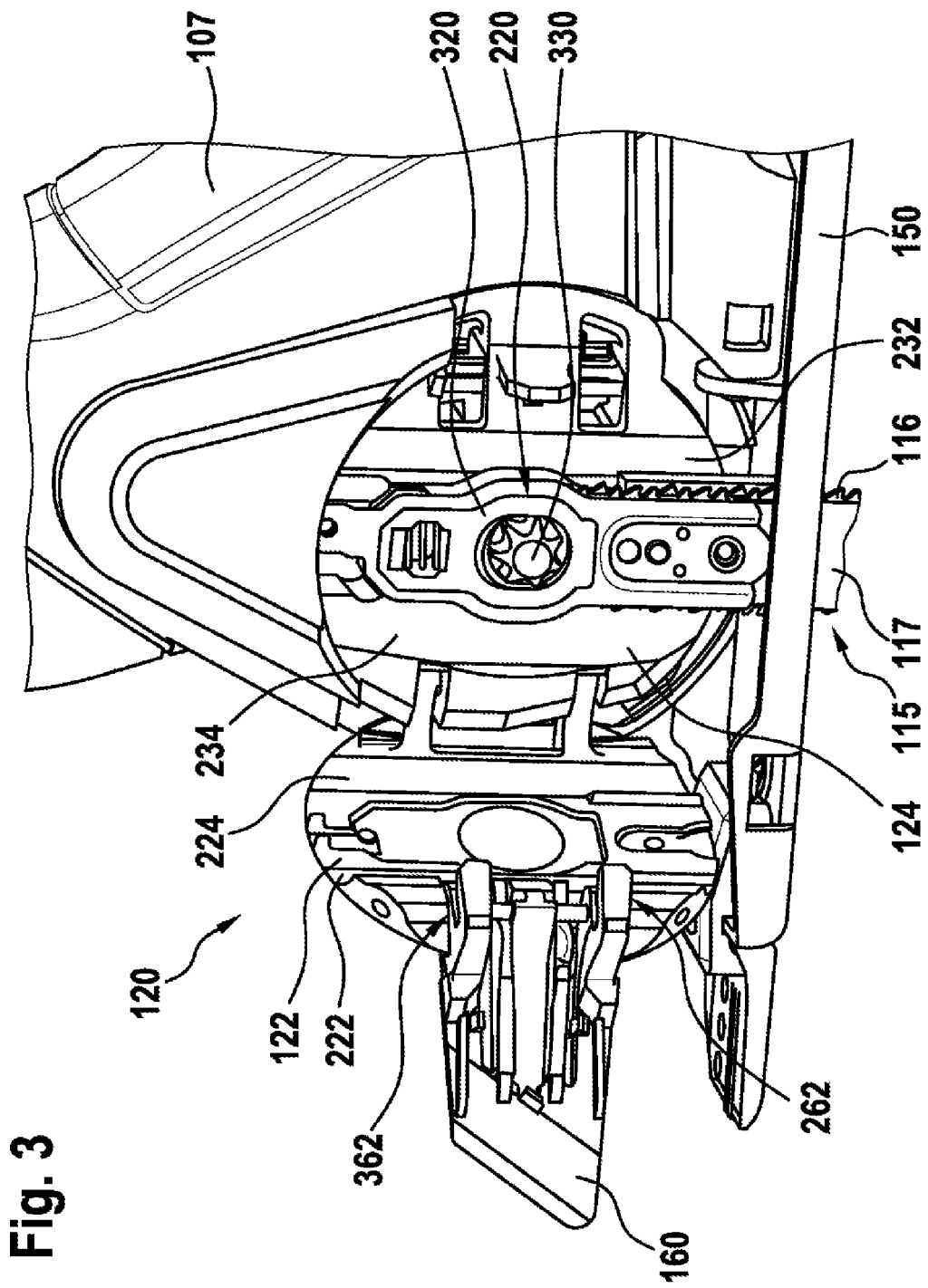

FIG. 2 shows a portion of the chain saw 100 from FIG. 1, viewed in the direction of an arrow II from FIG. 1 or, by way of illustration, viewed in the direction of the underside thereof, and illustrates the SDS tool receiver 120 with the receiver housing 122, 124 from FIG. 1, which comprises the main body 124 and the closure element 122. According to one embodiment, the SDS tool receiver 120 has at least one vacuuming-off channel 212, by way of illustration a first and a second vacuuming-off channel 212, 214, which are each realized to remove dust produced during working on a workpiece. Preferably, for this purpose the vacuuming-off channels 212, 214 can be connected to an external vacuuming cleaning system via the vacuuming-off connecting piece 130 from FIG. 1.

By way of illustration, the vacuuming-off channels 212, 214 are tubular in form, preferably having a circular cross section. It is pointed out, however, that the present disclosure is not limited to tubular vacuuming-off channels having a circular cross section, but may be applied in the case of any cross-sectional shapes, e.g. in the case of angled shapes.

According to one embodiment, the vacuuming-off channels 212, 214 are formed into the receiver housing 122, 124, and in this case are preferably realized, at least in regions, in the main body 124 thereof and/or in the closure element 122 thereof. Preferably, the main body 124 has at least one first and, by way of illustration, two first flute-type channels 232, 234, and the closure element 122 is provided with at least one second and, by way of illustration, two second flute-type channels 222, 224.

These first and second flute-type channels 232, 234, 222, 224 are preferably realized so as to realize the two vacuuming-off channels 212, 214 when the receiver housing 122, 124 is closed. For this purpose, the first and second flute-type channels 232, 234, 222, 224 preferably each have a semicircular cross section, and are realized in the main body 124, or in the closure element 122, in such a manner that, upon closure of the main body 124 by means of the closure element 122, the first flute-type channels 232, 234 overlap with the second flute-type channels 222, 224 and, with the latter, respectively realize tubular structures.

According to one embodiment, disposed in the main body 124 there is a clamping device 220, which is realized to clamp the insert tool 115 from FIG. 1, or the guide unit 117 with the cutting strand 116, at least portionally, in the SDS tool receiver 120. Operationally reliable locking of the clamping device 220 is effected in this case by closure of the main body 124 by means of the closure element 122. In order to prevent unintentional opening of the closure element 122 when the chain saw 100 from FIG. 1 is in operation, the closure element 122 can be locked, preferably latched, to the main body 124 by means of the locking element 160. For this purpose, the locking element 160 preferably has at least one latching element 262 that is realized, for example, after a latching lug that can be latched on the main body 124.

FIG. 3 shows the SDS tool receiver 120 from FIG. 1 and FIG. 2, to illustrate the flute-type channels 222, 224, 232, 234 from FIG. 2 that are realized in the main body 124 and in the closure element 122. These flute-type channels 222, 224, 232, 234, and therefore the vacuuming-off channels 212, 214 from FIG. 1 and FIG. 2, are preferably disposed on both sides of the insert tool 115 from FIG. 1 and FIG. 2. By way of illustration, the flute-type channels 222, 232 are disposed, in the longitudinal direction of the chain saw 100 from FIG. 1, on the right of the insert tool 115, or in the region between the insert tool 115 and the connecting lead 140 from FIG. 1, and the flute-type channels 224, 234 are disposed, in the longitudinal direction of the chain saw 100, by way of illustration, on the other side—on the left in FIG. 3—of the insert tool 115. Thus, sawing chips or dust that is produced, for example, during working on a workpiece can be removed, or vacuumed off, directly from the cutting strand 116.

It is pointed out, however, that the disposition, described above, of the flute-type channels 232, 234, 222, 224 in the longitudinal direction of the chain saw 100 from FIG. 1 is merely exemplary, and is not to be understood as limiting of the disclosure. Rather, said channels may also be disposed in the transverse direction, or in any other manner, and a different number of flute-type channels may also be implemented.

Furthermore, FIG. 3 illustrates the pivotable connection between the locking element 160 and the main body 124, and illustrates the locking element 160 preferably realized for latching on the main body 124. Said locking element is provided, at least, with the latching element 262 from FIG. 2, and preferably with at least one further latching element 362, which is preferably realized in a manner similar to the latching element 362.

It is pointed out that the latching elements 262, 362 are disposed on the locking element 160 merely by way of example, and alternatively may also be disposed on the main body 124 and/or on the tool housing 107. Moreover, functionally similar latching elements, or alternative locking elements, may be used, e.g. press pins.

Moreover, FIG. 3 shows the clamping device 220 of the insert tool 115 from FIG. 2 with a cutting-strand holding element 320 that, by way of illustration, is disposed on the guide unit 117 of the cutting strand 116. Preferably, the cutting-strand holding element 320 is realized, at least, to fix the guide unit 117 with the cutting strand 116 in the SDS tool receiver 120, or to a drive element 330 in an operationally reliable manner. The drive element 330 is connected to the drive motor 110, and is realized to drive the cutting strand 116.

Figure 4:
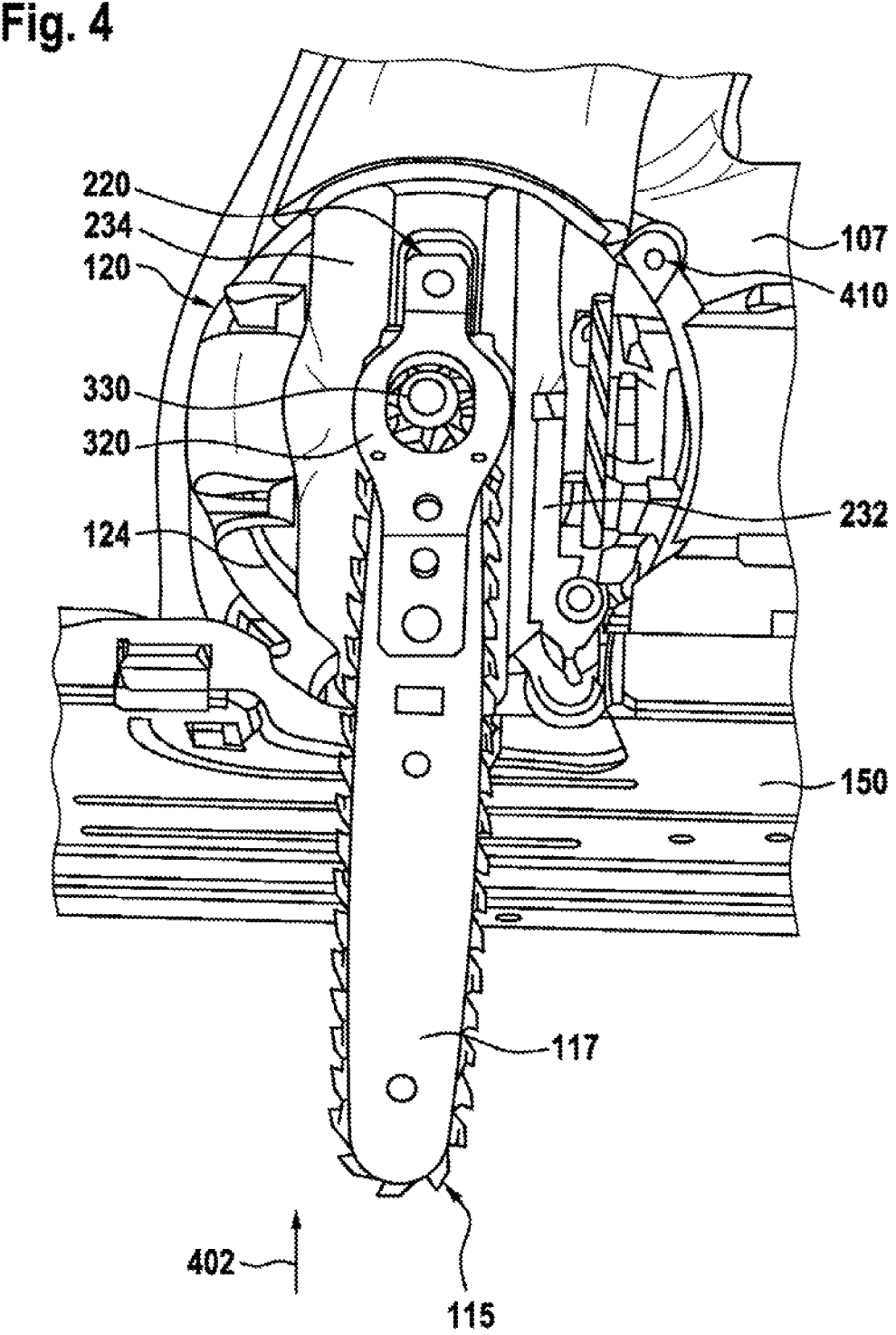

FIG. 4 shows the SDS tool receiver 120 from FIG. 1 to FIG. 3 with the main body 124 realized according to a second embodiment, in which, however, as described in the case of FIG. 2 and FIG. 3, the flute-type channels 232, 234 are disposed on both sides of the insert tool 115. Unlike the first embodiment represented in the case of FIG. 1, however, the main body 124 according to the second embodiment is realized to enable screw connection to the closure element 122 from FIG. 1 to FIG. 3. For this purpose, at least one screw thread 410 is preferably provided on the main body 124 according to the second embodiment.

Figure 5:
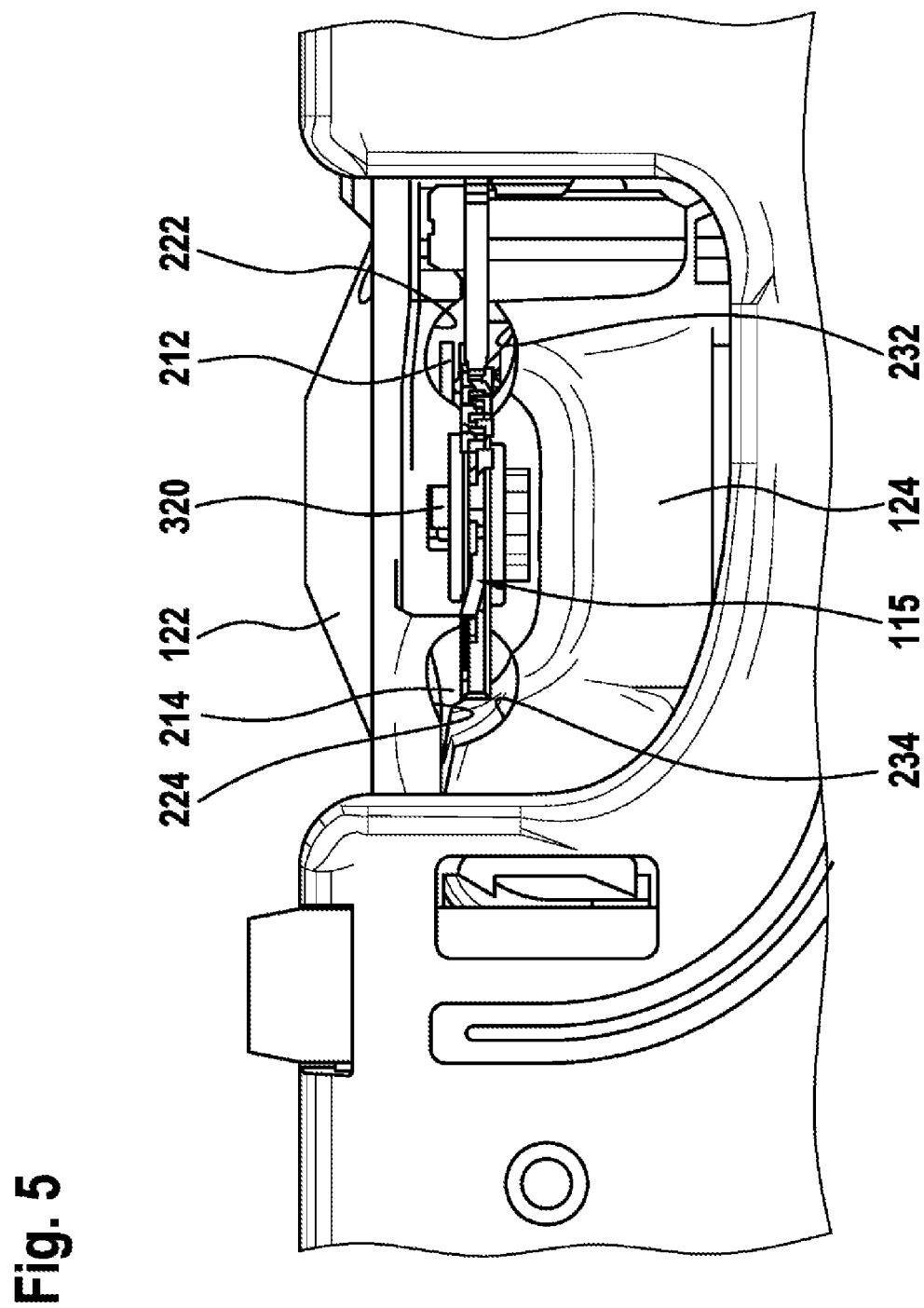

FIG. 5 shows the SDS tool receiver 120 from FIG. 4, as viewed in the direction of an arrow 402 from FIG. 4 or, by way of illustration, as viewed in the direction of the underside thereof. In a manner similar to FIG. 2, the flute-type channels 222, 224, 232, 234 realize a first and a second vacuuming-off channel 212, 214, which are preferably disposed on both sides of the insert tool 115 from FIG. 4. In this case, by way of illustration, the first vacuuming-off channel 212 is disposed on the right of the insert tool 115, and the second vacuuming-off channel 214 is disposed, by way of illustration, on the left of the insert tool 115.

The invention claimed is:

1. A hand-held power tool for driving an exchangeable insert tool having a cutting strand rotating on a guide unit, comprising:
 a vacuuming-off connecting piece adapted for engagement to an external vacuum cleaning system;
 a tool receiver including at least one vacuuming-off channel connected to said vacuuming-off connecting piece and configured to receive the guide unit of the exchangeable insert tool such that the at least one vacuuming-off channel enables removal of dust produced during operation of the exchangeable insert tool with a workpiece; and a tool housing including at least one drive unit configured to drive the cutting strand of the exchangeable insert tool when the exchangeable insert tool is received in said tool receiver, wherein the tool receiver further includes a main body and a closure element that is adjustable between an open position in which said main body is open and a closed position in which said main body is closed via the closure element, wherein said main body includes an opening for exchangeable insertion of the exchangeable insert tool into the tool receiver when the closure element is in said open position and said main body is open, the vacuuming-off connecting piece is disposed on the tool housing;

wherein said closure element is configured to close said opening in said closed position when said main body is closed, and further wherein the at least one vacuuming-off channel is formed when the closure element is in said closed position to close the main body.

2. The hand-held power tool as claimed in claim 1, wherein the tool receiver further includes a receiver housing that defines the at least one vacuuming-off channel.

3. The hand-held power tool as claimed in claim 1, wherein:
the main body is connected to the tool housing, formed onto the tool housing, or integral with the tool housing.

4. The hand-held power tool as claimed in claim 3, further comprising a clamping device disposed within the main body and configured to clamp the exchangeable insert tool.

5. The hand-held power tool as claimed in claim 3, wherein the at least one vacuuming-off channel at least partially defined in at least one of: (i) the main body and (ii) the closure element.

6. The hand-held power tool as claimed in claim 3, wherein the closure element includes a locking element configured to lock the closure element to the main body.

7. The hand-held power tool as claimed in claim 6, wherein the locking element includes at least one latching element and is configured to latch onto the main body.

8. The hand-held power tool as claimed in claim 3, wherein the closure element is pivotably mounted on the main body.

9. The hand-held power tool as claimed in claim 1, wherein the at least one vacuuming-off channel has a tubular shape.

10. The hand-held power tool as claimed in claim 1, wherein the tool receiver is further configured to receive an exchangeable insert tool that has a cutting strand configured to revolve around an assigned guide unit.

11. The hand-held power tool as claimed in claim 1, wherein the hand-held power tool is a chain saw.

12. A hand-held power tool for driving an exchangeable insert tool having a cutting strand rotating on a guide unit, comprising:
a vacuuming-off connecting piece adapted for engagement to an external vacuum cleaning system;
a tool receiver including at least one vacuuming-off channel connected to said vacuuming-off connecting piece and configured to receive the guide unit of the exchangeable insert tool such that the at least one vacuuming-off channel enables removal of dust produced during operation of the exchangeable insert tool with a workpiece; and
a tool housing including at least one drive unit configured to drive the cutting strand of the exchangeable insert tool when the exchangeable insert tool is received in said tool receiver, wherein:
the vacuuming-off connecting piece is disposed on the tool housing;
the tool receiver further includes a main body and a closure element that is adjustable between an open position in which said main body is open and a closed position in which said main body is closed via the closure element;
the main body is connected to the tool housing, formed onto the tool housing, or integral with the tool housing;
the main body includes at least one first channel having a semicircular cross-section;
the closure element includes at least one second channel having a semicircular cross-section; and
in the closed position, the first channel and the second channel combine define the at least one vacuuming-off channel.

13. A hand-held power tool for driving an exchangeable insert tool having a cutting strand rotating on a guide unit, comprising:
a vacuuming-off connecting piece adapted for engagement to an external vacuum cleaning system;
a tool receiver including at least one vacuuming-off channel connected to said vacuuming-off connecting piece and configured to receive the guide unit of the exchangeable insert tool such that the at least one vacuuming-off channel enables removal of dust produced during operation of the exchangeable insert tool with a workpiece; and
a tool housing including at least one drive unit configured to drive the cutting strand of the exchangeable insert tool when the exchangeable insert tool is received in said tool receiver,
wherein the tool receiver further includes a main body and a closure element that is adjustable between an open position in which said main body is open and a closed position in which said main body is closed via the closure element,
wherein the vacuuming-off connecting piece is disposed on the tool housing;
further wherein the at least one vacuuming-off channel is formed when the closure element is in said closed position to close the main body,
wherein the closure element includes a locking element configured to lock the closure element to the main body, the locking element configured to connect to the main body via a screw connection, the main body including at least one screw thread.

14. A hand-held power tool for driving an exchangeable insert tool having a cutting strand rotating on a guide unit, comprising:
a vacuuming-off connecting piece adapted for engagement to an external vacuum cleaning system;
a tool receiver including at least one vacuuming-off channel connected to said vacuuming-off connecting piece and configured to receive the guide unit of the exchangeable insert tool such that the at least one vacuuming-off channel enables removal of dust produced during operation of the exchangeable insert tool with a workpiece; and
a tool housing including at least one drive unit configured to drive the cutting strand of the exchangeable insert tool when the exchangeable insert tool is received in said tool receiver,
wherein the tool receiver further includes a main body, a clamping device disposed within the main body configured to clamp the exchangeable insert tool to the main body, and a closure element that is adjustable between an open position in which said main body is open for access to said clamping device to engage the exchangeable insert tool to the clamping device and a closed position in which said main body is closed via the closure element preventing engagement of the exchangeable insert tool to the clamping device or disengagement of the exchangeable insert tool from the clamping device, wherein the vacuuming-off connecting piece is disposed on the tool housing;

further wherein the at least one vacuuming-off channel is formed when the closure element is in said closed position to close the main body.

* * * * *